United States Patent [19]
Butler

[11] Patent Number: 6,038,751
[45] Date of Patent: *Mar. 21, 2000

[54] METHOD OF SETTING STONES BY USING A JEWELRY PRONG HEAD FOR ACCOMMODATING VARIOUS SIZE STONES

[75] Inventor: Jerome Butler, Great Neck, N.Y.

[73] Assignee: Alfred Butler, Inc., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/911,179

[22] Filed: Aug. 14, 1997

[51] Int. Cl.⁷ ........................................... B23P 5/00
[52] U.S. Cl. ..................... 29/10; 206/6.1; 63/27
[58] Field of Search ............. 63/26, 27; D11/91, D11/92; 29/10; 229/101; 206/6.1

[56] References Cited

U.S. PATENT DOCUMENTS

| | | |
|---|---|---|
| 131,058 | 9/1872 | Herpers . |
| D. 217,492 | 5/1970 | Gotze . |
| 851,469 | 4/1907 | Worstall ........................................ 29/10 |
| 1,030,990 | 7/1912 | Farnham . |
| 1,081,153 | 12/1913 | Rosenthal . |
| 1,326,977 | 1/1920 | Schwartzman . |
| 1,385,702 | 7/1921 | Mountford . |
| 1,400,460 | 12/1921 | Rosenthal . |
| 1,864,371 | 6/1932 | Prussian . |
| 2,184,749 | 12/1939 | Manne et al. ................................ 63/27 |
| 2,791,367 | 5/1957 | Mefford ................................... 229/101 |
| 3,261,072 | 7/1966 | Stanley . |
| 3,751,795 | 8/1973 | Favre ........................................ 29/558 |
| 3,910,067 | 10/1975 | Rumbaugh . |
| 4,793,156 | 12/1988 | Pence . |
| 5,071,062 | 12/1991 | Bradley et al. ......................... 229/101 |

*Primary Examiner*—P. W. Echols
*Attorney, Agent, or Firm*—Gottlieb Rackman & Reisman PC

[57] ABSTRACT

A jewelry setting for accommodating a plurality of different size stones is provided. The jewelry setting includes a plurality of prongs each angularly directed from a substantially common location such that any of a number of different size stones may be set within the prongs without adjusting the angular direction of any of the prongs.

6 Claims, 2 Drawing Sheets

METHOD OF SETTING STONES BY USING A JEWELRY PRONG HEAD FOR ACCOMMODATING VARIOUS SIZE STONES

BACKGROUND OF THE INVENTION

This invention relates to a gem setting, and more particularly to a gem setting including prongs for accommodating various size stones.

Gem settings normally comprise a number of metal prongs radiating from a base which typically are bent over in order to capture a jewelry stone. Alternatively, the prongs are notched adjacent the distal ends, and the stones are disposed between the notches in order to hold the jewelry stone in place.

For round cut stones, such as diamonds, the prongs are designed to accommodate one or perhaps two different sizes. However, the vast majority of diamonds stones come in a range of ½ carat (5 mm) through 2 carats (8 mm). For these different size stones, different prong designs are required in order to cooperatively seat these various size stones in the jewelry setting. This is less than desirable since the jewelry manufacturer must carry a plurality of differently configured settings in order to be able to have various size stones captured in the jewelry piece that is being created.

Accordingly, it would be desirable to provide a jewelry setting which overcomes the above disadvantages.

SUMMARY OF THE INVENTION

Generally speaking, in accordance with the invention, a jewelry setting for accommodating a plurality of different size stones is provided. The jewelry setting includes a plurality of prongs each angularly directed from a substantially common location such that any of a number of different size stones may be set within the prongs without adjusting the angular direction of any of the prongs.

In particular, the selected stone is set within the prongs at a certain height level therealong. For larger size stones (up to 2 carats), the stone fits in the prongs at a height greater than that for seating smaller size stones. Once the stone is seated appropriately within the prongs, the distal portions thereof that extend past the table portion of the stone are shaved away by any conventional technique.

In order for the prongs of the setting to securely engage the seated stone, each prong is formed with an inwardly directed notch formed adjacent the distal ends of the prongs (after shaved to an appropriate size), which engage the stone along the outer circumference thereof in order to hold the stone in place within the setting.

Accordingly, it is an object of the invention to provide a gem setting suitable for accommodating various size stones.

Another object of the invention is to provide a gem setting to reduce the required inventory of the jewelry manufacturer.

A further object of the invention is to provide a gem setting in which a plurality of prongs are angularly directed for accommodating a wide range of stone sizes.

Still other objects and advantages of the invention will in part be obvious and will in part be apparent from the following description.

The invention accordingly comprises the features of construction, combination of elements, and arrangement of parts which are depicted in the following description, and the scope of the invention shall be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Figure 1:
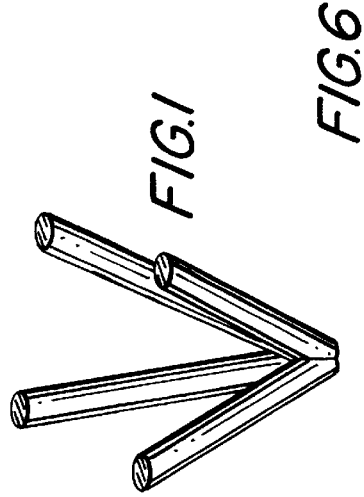
FIG. 1 is a perspective view in elevation of a first embodiment of the inventive gem setting.

Referring first to FIG. 1, a first embodiment of the inventive jewelry setting, generally indicated at 11, is now described. Setting 11 is typically fixed along the band of a ring or some other jewelry piece and includes a base portion 13 and four metal prongs angularly radiating from base 13. Each of prongs 15 is directed at substantially the same angle with respect to the axis of setting 11 and are equally radially spaced from one another. As will be appreciated later on, prongs 15 are disposed in an angular direction from base 13 in order for setting 11 to accommodate a wide range of gem stone sizes. In accordance with the invention, each prong is disposed at an angle with respect to the axis of setting 11 in a range between about 20°–30°, with the preferred range being between 24° and 26°.

Figure 2:
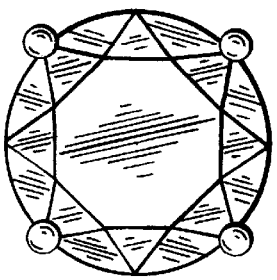
FIG. 2 is a top plan view showing a 2 carat size gem stone seated in the jewelry setting of the invention.
Figure 3:
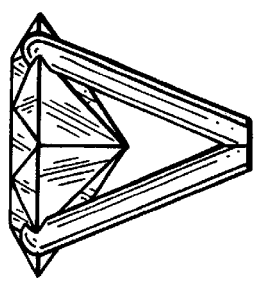
FIG. 3 is a front elevational view of the gem stone of FIG. 2 seated in the inventive jewelry setting.

Turning now to FIGS. 2 and 3, jewelry setting 11 of the invention is shown with a two carat round diamond stone 21 captured therein. Stone 21, as is well known in the art, comprises a table portion 23, a girdle portion 25 terminating to an outer circumference 27, and a pavilion portion 29 formed below girdle portion 25. In order to seat stone 21 in setting 11, notches 28 are formed along the inward portion of prongs 15 adjacent their distal ends. Notches 28 are sized to engage and otherwise grab stone 21 along outer circumference 27, as best depicted in FIG. 3, in order to hold stone 21 in place within setting 11.

Figure 4:
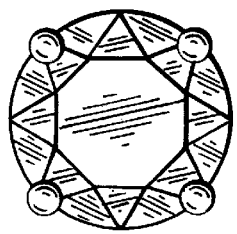
FIG. 4 is a top plan view showing a 1½ carat size gem stone seated in the jewelry setting of the invention.
Figure 5:
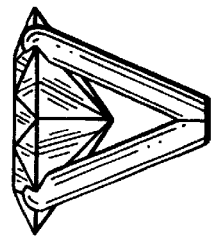
FIG. 5 is a front elevational view of the gem stone of FIG. 4 seated in the inventive jewelry setting.

Turning now to FIGS. 4 and 5, jewelry setting 11 is shown capturing a smaller size 1½ carat round diamond stone 31. As before, stone 31 comprises a table portion 33, a girdle portion 35, an outer circumference 37 and a pavilion portion 39. In order to seat stone 31 appropriately within setting 11, stone 31 must be disposed at a lower height within prongs 15. This is because the diameter and overall size of stone 31 is less than that of stone 21 depicted in FIGS. 2 and 3.

Therefore, and in accordance with the invention, after first measuring the height level at which stone 31 is appropriately seated within setting 11, a portion of prongs 15 adjacent their distal ends, and which would otherwise extend upwardly past table portion 33 of stone 11 when seated in setting 11, is shaved away using any type of conventional jewelry tool, such as a bearing cutter. As a result, as best depicted in FIG. 5, prongs 15 have a length less than that of the embodiment of FIGS. 2–3. As before, prongs 15 are then formed with inwardly directed notches adjacent their shaved distal ends for capturing stone 31 along outer circumference 35.

Figure 6:
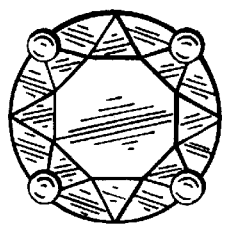
FIG. 6 is a top plan view showing a 1 carat size gem stone seated in the jewelry setting of the invention.
Figure 7:
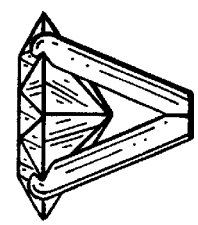
FIG. 7 is a front elevational view of the gem stone of FIG. 6 seated in the inventive jewelry setting.

In FIGS. 6 and 7, still a smaller size 1 carat round diamond stone 41 is shown captured in jewelry setting 11 of the invention. Stone 41, as before, includes a table portion 43, a girdle portion 45, an outer circumference 47, and a pavilion portion 49. In this version, in order for setting 11 to appropriately accommodate stone 41, the distal ends of prong 15 are shaved even further. This is because stone 41 is seated within setting 11 at a height less than that depicted in the previous embodiment.

Figure 8:
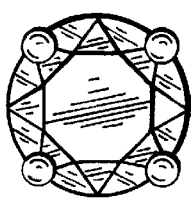
FIG. 8 is a top plan view showing a ½ carat size gem stone seated in the jewelry setting of the invention.
Figure 9:
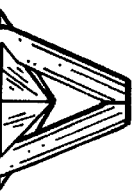
FIG. 9 is a front elevational view of the gem stone of FIG. 8 seated in the inventive jewelry setting.

Finally, FIGS. 8–9 describe the use of the inventive jewelry setting for capturing the still smaller round ½ carat diamond stone 51. Stone 51 includes a table portion 53, a girdle portion 55, a circumference 57 and a pavilion portion 59. In order to seat stone 51 appropriately within setting 11, the distal ends of prong 15 are substantially shaved, in an amount greater than in any of the previous versions.

Figure 10:
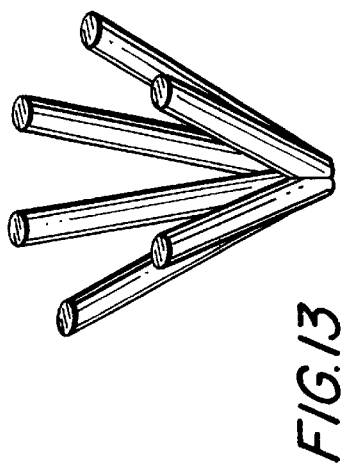
FIG. 10 is a perspective view in elevation of a second embodiment of the jewelry setting of the invention.

Turning now to FIG. 10, a second embodiment of the inventive jewelry setting, generally indicated at 61, is now described. As with the embodiment depicted in FIG. 1, setting 61 includes a base 63 from which six (as opposed to four) prongs 65 angularly radiate therefrom. Each of prongs 65 are of substantially the same length and size, and each is equally radially spaced from one another. Additionally, each of prongs 65 is directed at the same angle with respect to the axis of setting 61 such that setting 61 can accommodate jewelry stones of various sizes, as now described.

Figure 11:
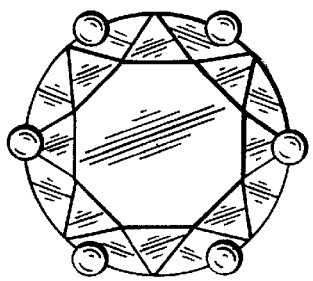
FIG. 11 is a top plan view showing a 2 carat size gem stone seated in the second embodiment of the jewelry setting of the invention.
Figure 12:
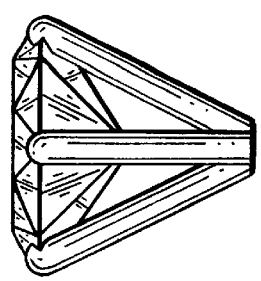
FIG. 12 is a front elevational view of the gem stone of FIG. 11 seated in the second embodiment of the inventive jewelry setting.

In FIGS. 11 and 12, setting 61 is shown with the two carat round stone 21 depicted in FIGS. 2 and 3 mounted therein. In this version, each of prongs 65 is formed with an inwardly directed notch adjacent the distal ends thereof for engaging with stone 21 along outer circumference 27.

Figure 13:
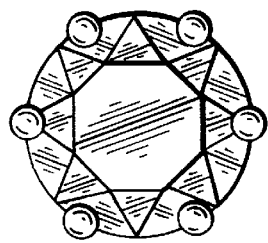
FIG. 13 is a top plan view showing a 1½ carat size gem stone seated in the second embodiment of the jewelry setting of the invention.
Figure 14:
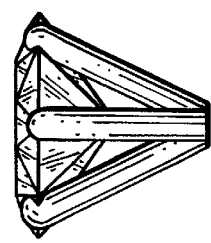
FIG. 14 is a front elevational view of the gem stone of FIG. 13 seated in the second embodiment of the inventive jewelry setting.

In the version depicted in FIGS. 13–14, setting 61 is shown capturing stone 31 (see FIGS. 4 and 5). As before, in order to seat stone 41 appropriately within setting 61, stone 31 is first placed at a height within prongs 65 such that the prongs can engage circumference 37. Distal portions of prongs 65 which extend past table portion 33 are the shaved away in an appropriate amount, utilizing any type of conventional jeweler's tool.

Figure 17:
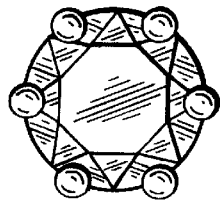
FIG. 17 is a top plan view showing a ½ carat size gem stone seated in the second embodiment of the jewelry setting of the invention.
Figure 18:
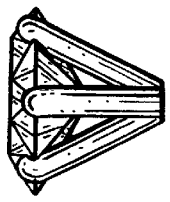
FIG. 18 is a front elevational view of the gem stone of FIG. 17 seated in the second embodiment of the inventive jewelry setting.
Figure 15:
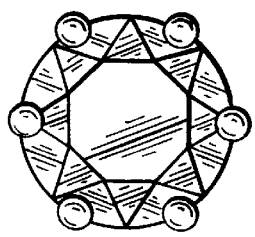
FIG. 15 is a top plan view showing a 1 carat size gem stone seated in the second embodiment of the jewelry setting of the invention.
Figure 16:
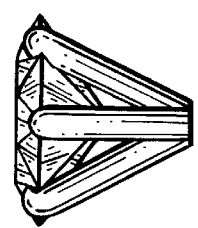
FIG. 16 is a front elevational view of the gem stone of FIG. 15 seated in the second embodiment of the inventive jewelry setting.

FIGS. 15 and 16 show setting 61 capturing 1 carat round diamond stone 41 while FIGS. 17–18 show setting 61 capturing ½ carat round diamond stone 51. As before, prongs 15 can accommodate these different size stones by having the stones set at decreasing levels within setting 61, and then shaving off those portions of prongs 65 which extend past the top of the stones.

In general, the inventive jewelry setting includes a plurality of angularly extending prongs for accommodating therewithin any number of sized round gem stones. As discussed previously, larger stones are set at higher levels within the setting, while smaller stones are set at lower levels. Because of the angular disposition of the prongs, and the fact that they all extend from a substantially common location in the base of the setting, a wide range of stone sizes may be placed within the jewelry setting.

In accordance with the invention, because a single jewelry setting unit can accommodate most round jewelry stones (anywhere from about ½ carat to about 2 carats), the jewelry manufacturer will be able to conduct business in a more economical fashion. In the first place, the inventive setting eliminates the need for the jewelry manufacturer to reorder styles because the customer provides the manufacturer with the wrong size information. In addition, the manufacturer does not have to carry extra inventory so as to accommodate various size stones. Further, the manufacturer will not have to change the heads of existing inventory, which can be costly and take substantial time.

It will thus be seen that the objects set forth above, among those made apparent from the preceding description, are efficiently attained and, since certain changes may be made in designing the inventive jewelry setting unit without departing from the spirit and scope of the invention, it is intended that all designs are incorporated in the inventive scope.

I claim:

1. A method for capturing a round cut gem of varying size in a jewelry setting having a plurality of substantially straight prongs substantially uniformly angularly directed from a substantially common location in a base thereof, the method comprising seating said gem along said prongs at a height above said base without adjusting the angular direction of said prongs, and shaving the distal ends of said prongs such that said prongs do not extend substantially past the height of said seated gem.

2. The method of claim 1, further including the steps of forming notches along the inward portions of said prongs adjacent the distal ends thereof following said shaving step and engaging said notches with the outer circumference of said gem.

3. A method of setting a plurality of stones of different sizes in the range of ½ to 2 carats comprising the steps of:

providing a setting for each of said stones, each setting being identical and independent of the size of the stone to be set and having a plurality of substantially straight prongs, each prong having a distal end and being uniformly angularly directed from a common location on a base;

shortening the distal ends of said prongs for each of said setting by an amount sufficient such that the prongs do not extend substantially above the respective stone when said respective stone is seated in said setting between prongs; and mounting each of said stones into a corresponding setting without adjusting substantially the angular direction of said prongs.

4. The method of claim 3 further comprising cutting notches in said prongs for seating said stones.

5. The method of claim 3 wherein said step of shortening said distal ends includes shaving said ends.

6. A method of setting a plurality of stones of different sizes in the range of ½ to 2 carats comprising the steps of:

making a plurality of identical settings, each setting having a base and a plurality of prongs extending from said base at a uniform angle of about 20–30 degrees;

providing one of said settings for each of said stones;

shortening the distal ends of said prongs for each of said setting by an amount sufficient such that the prongs do not extend substantially above the respective stone when said respective stone is seated in said setting between prongs; and mounting each of said stones into a corresponding setting without adjusting substantially the angular direction of said prongs.

* * * * *